United States Patent [19]

Coenen et al.

[11] 4,400,398

[45] Aug. 23, 1983

[54] METHOD FOR OBTAINING AROMATICS AND DYESTUFFS FROM BELL PEPPERS

[75] Inventors: Hubert Coenen; Rainer Hagen, both of Essen; Manfred Knuth, Hamburg, all of Fed. Rep. of Germany

[73] Assignee: Fried. Krupp Gesellschaft mit beschränkter Haftung, Essen, Fed. Rep. of Germany

[21] Appl. No.: 365,473

[22] Filed: Apr. 5, 1982

[30] Foreign Application Priority Data

Apr. 10, 1981 [DE] Fed. Rep. of Germany ....... 3114593

[51] Int. Cl.³ .................... A23L 1/277; A23L 1/28; A23L 1/221
[52] U.S. Cl. .................................. 426/429; 426/430; 426/475; 426/478; 426/651; 426/655; 426/540
[58] Field of Search ............... 426/429, 430, 475, 478, 426/655, 250, 540; 260/412.4

[56] References Cited

U.S. PATENT DOCUMENTS

| | | |
|---|---|---|
| 3,526,509 | 9/1970 | Yamada ................ 426/429 |
| 3,939,281 | 2/1976 | Schwengers ........... 426/429 |
| 4,104,409 | 8/1978 | Vitzthum et al. ...... 426/655 |
| 4,123,559 | 10/1978 | Vitzthum et al. ...... 426/655 |
| 4,233,210 | 11/1980 | Koch .................... 426/429 |
| 4,331,695 | 5/1982 | Zosel ..................... 426/429 |

Primary Examiner—Jeanette M. Hunter
Attorney, Agent, or Firm—Spencer & Kaye

[57] ABSTRACT

Method for obtaining aromatics and/or dyestuffs from bell peppers wherein red pepper is extracted with a solvent which is in a supercritical state and is gaseous under normal conditions. The extraction takes place at a pressure of $>P_k$ to 350 bar and a temperature of $>T_k$ to 70° C. The extracted aromatics and/or dyestuffs are separated from the separated supercritical gas phase by lowering the density of the gas phase.

25 Claims, 1 Drawing Figure

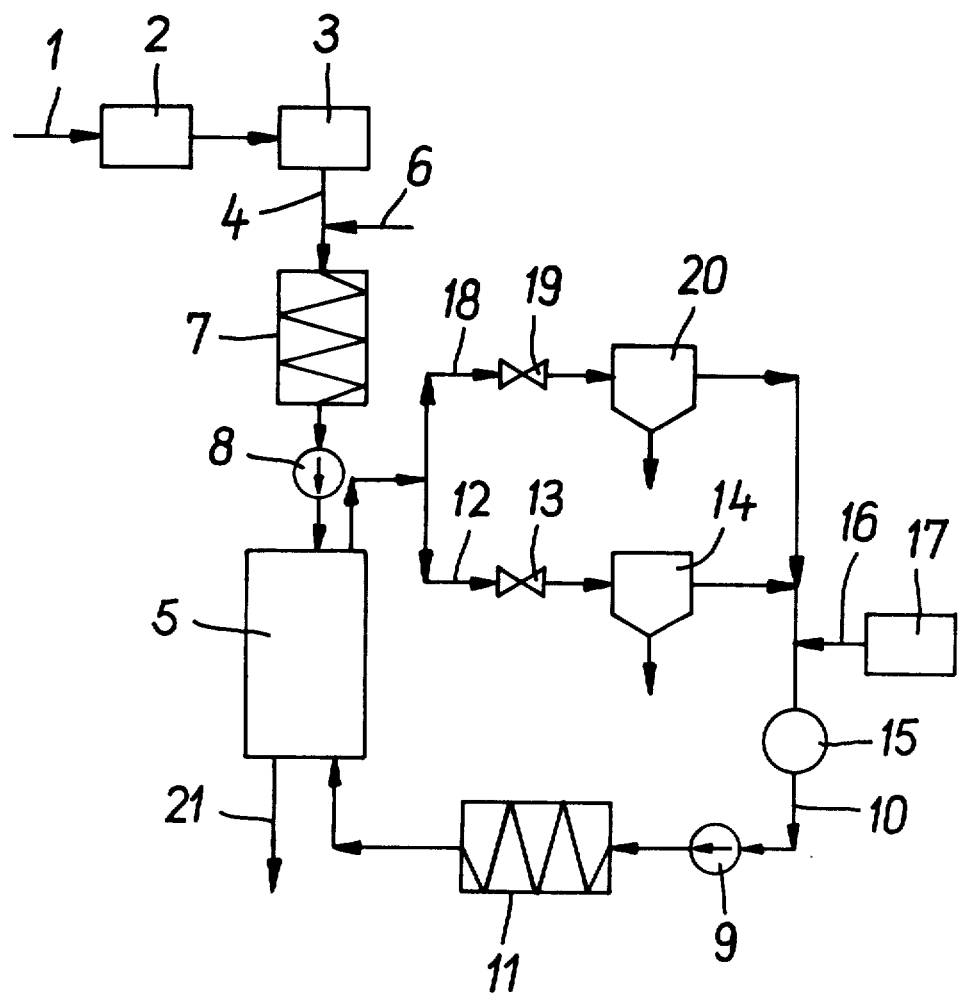

METHOD FOR OBTAINING AROMATICS AND DYESTUFFS FROM BELL PEPPERS

BACKGROUND OF THE INVENTION

The present invention relates to a method for obtaining aromatics and/or dyestuffs from bell peppers by extraction of the pepper with a solvent.

The fruits of many of the about 50 cultured varieties of bell peppers (*capsicum annuum* or *capsicum longum*) contain aromatics and red dyestuffs. The aromatics contain fragrances and flavors and also contain the alkaloid, capsaicin which, even when greatly diluted, still has a very pungent taste. Bell pepper varieties have been grown which are free of capsaicin and are called "noble" sweet peppers. The aromatics of bell peppers can be used for the production of seasoning mixtures. The red dyestuffs of bell peppers contain carotinoids and their major component (up to 35%) is the carotinoid, capsanthin. The red dyestuffs are suitable for coloring foods and cosmetics and, because of their physiological harmlessness, are also approved as food dyes. In the food and cosmetics industry, the dyestuffs from bell peppers are used in the form of a liquid concentrate which is substantially free of impurities. For many applications, the dyestuff concentrate must not contain the aromatics of the pepper plant, particularly the capsaicin.

According to a known process, the aromatics and dyestuffs of bell peppers are obtained by extraction with a low boiling point solvent, such as, for example, dichloromethane, dichloroethane or hexane. From the extract obtained from the extraction, the aromatics and dyestuffs must be separated by way of a complicated molecular distillation since only the red dyestuffs which are free from aromatics are suitable for coloring many foodstuffs and cosmetics. Since bell peppers contain only small amounts of aromatics and dyestuffs (the dyestuff content of dried pepper is 1.4 to 5 percent by weight), large quantities of solvent are required for the pepper extraction, and these quantities of solvent must be recovered from the extract and the extraction residue by distillation or steam distillation in vacuo, respectively. In both cases, the organic solvent cannot be removed completely, particularly from the porous extraction residue, so that the losses of solvent are considerable and the use of the extraction residue as animal feed is greatly limited. Moreover, during the distillative removal of the solvent remainders from the extract, the higher temperatures required and/or the presence of oxygen may cause partial denaturization of the aromatics and dyestuffs in the extract.

German Auslegeschrift No. 1,493,190 discloses a process for separating mixtures of liquid and/or solid organic substances, wherein the mixture is treated with a gas whose temperature and pressure are in the supercritical state to form a charged supercritical gas phase. The treatment takes place in a temperature range up to 100° C. above the critical temperature of the gas. After separation of the charged supercritical gas phase, the compounds contained therein are recovered by expansion and/or an increase in temperature. In this prior art process, saturated or unsaturated lower hydrocarbons, chlorinated or fluorinated hydrocarbons, carbon dioxide, ammonia or nitrous oxide can be used as the gaseous solvent.

SUMMARY OF THE PRESENT INVENTION

It is an object of the present invention to provide a process for obtaining aromatics and/or dyestuffs from bell peppers which avoids the drawbacks of the prior art liquid extraction process and furnishes high quality, physiologically harmless aromatics and/or dyestuffs.

A further object of the present invention is to provide such a process which permits economical dyestuff recovery from pepper at low temperatures since there exists a broad range of applications for the high quality red dyestuffs from bell peppers.

Another object of the present invention is to provide such a process in which the residues obtained in the recovery of the aromatics and dyestuffs can be used as animal feed.

A still further object of the present invention is to provide a process for separating paprika oleotesin into aromatics and into dyestuffs.

Additional objects and advantages of the present invention will be set forth in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose the present invention provides a process for treating bell peppers which contain aromatics and dyestuffs by extraction of the bell peppers with a solvent, comprising extracting dried, comminuted, red pepper by a solvent which is in a supercritical state with respect to pressure and temperature and which, under normal conditions is a gas, at a pressure $>p_k$ to 350 bar and at a temperature of $>T_k$ to 70° C. to form (a) a charged supercritical gas phase containing an extract which comprises at least the aromatics and/or the dyestuffs and (b) an extraction residue, separating the charged supercritical gas phase from the extraction residue, and separating the extract from the separated, charged, supercritical gas phase by reducing the density of the gas phase.

It is to be understood that both the foregoing general description and the following detailed description are exemplary, but are not restrictive of the invention.

BRIEF DESCRIPTION OF THE DRAWING

The sole FIGURE of the drawing shows a schematic representation of a system for practicing the method according to the present invention.

DETAILED DESCRIPTION OF THE INVENTION

The process of the present invention comprises treating bell peppers which contain aromatics and dyestuffs by extraction of the peppers with a solvent. The peppers to be extracted are dried and comminuted before they are subjected to the extraction. The dried, comminuted red peppers are then extracted with a solvent which is in the supercritical state with respect to pressure and temperature and which under normal conditions is a gas. The extraction is conducted at a pressure of $>p_k$ to 350 bar and a temperature of $>T_k$ to 70° C. to form (a) a charged supercritical gas phase containing an extract and (b) an extraction residue. For example, the extraction pressure can be 20 bar greater than $p_k$, and the extraction temperature can be only slightly above the critical temperature, and can be, for example, 2° C.

greater than $T_k$. The extract in the charged supercritical gas phase comprises the aromatics, or the dyestuffs, or the aromatics and dyestuffs. The extraction residue and the charged supercritical gas phase are separated from each other. The extract is then separated from the separated, charged supercritical gas phase by a reduction in the density of the gas phase.

The process according to the present invention avoids the use of physiologically harmful, liquid, organic solvents, particularly halogenated hydrocarbons. The gaseous solvents used according to the present invention can be separated quantitatively and without difficulty at room temperature from the extract as well as from the extraction residues, and it is further possible to recover the gaseous solvents substantially without losses. The extraction residue can be processed into feed without hesitiation since it contains neither remainders of solvent nor is it denatured by high temperature. Also, the extract need not be freed from the remaining solvent at increased temperature by way of distillation and therefore the aromatics and dyestuffs obtained are of a very high quality.

The process according to the present invention can be used to particular advantage if carbon dioxide, ethane, ethene or a mixture of ethane and ethene are used as the gaseous solvent because these solvents remain chemically inert with respect to the pepper and leave no physiologically harmful residues in the resulting products.

According to the present invention, the extraction output can be increased by providing an entrainer in the gaseous solvent. The entrainer preferably is ethanol. Other suitable entrainers are acetone, or water, or mixtures of water and ethanol, or mixtures of water and acetone. The concentration range of the entrainers in the gaseous solvent is between 1% and 30%.

According to the present invention, the density of the charged supercritical gas phase is lowered by reduction in pressure, or by a reduction in pressure and a change in temperature. For the pressure reduction, it is preferred to employ a pressure difference which is as small as possible between the extraction pressure and the separation pressure so that recompression energy can be saved in an advantageous manner. The change in temperature can be effected by reducing the temperature or by increasing the temperature, but care must be taken that separation temperatures above 70° C. are avoided. If, for example, ethene is used as the extraction agent, whose critical temperature is 9.5° C., the extraction temperature may be at 25° C. and the separation temperature at 50° C. The reduction of the density of the supercritical gas phase according to the present invention assures that the aromatics and dyestuffs are obtained through a thermally gentle treatment.

The process according to the present invention can be applied with particular success by employing a two stage extraction wherein aromatics are separated from the pepper during a first extraction phase and the dyestuffs are extracted during a second extraction phase. In such a process, the pepper is extracted in a first stage at a pressure of $>p_k$ to 150 bar to obtain a charged supercritical gas phase containing aromatics and a first extraction residue. The charged supercritical gas phase containing aromatics is then separated from the first extraction residue. The extracted aromatics in the separated, charged, supercritical gas phase of the first extraction stage are then separated therefrom. The first extraction residue, which is the pepper freed from the aromatics, is then extracted in a second stage at a pressure of 150 to 350 bar to obtain a charged supercritical gas phase containing extracted dyestuff and a second extraction residue. The second extraction residue is then separated from the charged supercritical gas phase containing the extracted dyestuffs. The extracted dyestuffs thereafter are separated from the separated, charged, supercritical gas phase of the second extraction stage. This two-stage extraction results in optimum separation of the aromatics and dyestuffs. The two-stage extraction is particularly easy to engineer if the same gaseous solvent is used in both extraction stages.

A further advantageous possibility for obtaining aromatics and dyestuffs from bell peppers according to the present invention comprises extracting the pepper at 150 to 350 bar to form (a) a charged supercritical gas phase containing aromatics and dyestuffs and (b) an extraction residue. The charged supercritical gas is then separated from the extraction residue. Thereafter, first the dyestuffs are separated from the charged supercritical gas phase in at least one fraction, and then the aromatics are separated, in at least one fraction, from the separated, charged, supercritical gas phase. The separations from the charged supercritical gas phase are achieved by stepwise reduction of the density of the gas phase. With this manner of implementing the process of the present invention, all extractable substances are initially transferred to the gas phase, and then are separated from the gas phase in at least two fractions, the dyestuffs being obtained in the first fraction and the aromatics in the second fraction. The purity of the aromatics and dyestuffs can be increased by having the respective separations take place in a plurality of fractions, and returning those fractions which do not meet quality requirements to the extraction.

The process according to the present invention can be implemented in an advantageous manner so that only the dyestuffs and aromatics are extracted by the supercritical gas from pepper which is free of capsaicin (noble sweet pepper). With this embodiment of the process of the present invention, a dyestuff can be produced which is eminently suitable for many purposes. When using this embodiment of the present invention, there is only an extraction to obtain the dyestuffs and aromatics free of capsaicin, and the supercritical gas preferably is at a pressure of 150 to 350 bar and a temperature of $>T_k$ to 70° C. for the extraction. In this embodiment of the present invention, the starting material is a noble sweet pepper, which is free of capsaicin.

In one preferred embodiment of the present invention, instead of using pepper as the starting material which is subjected to treatment by a supercritical gas, paprika oleoresin is used as the starting material. Paprika oleoresin is a product which is obtained by the extraction of pepper with liquid solvents, such as, for example, dichloroethane, dichloromethane or hexane and contains, in addition to remainders of solvents, the aromatics as well as the red dyestuffs of the pepper. The paprika oleoresin can be purified in accordance with the present invention in such a manner that only the aromatics are extracted from the paprika oleoresin by the supercritical gas. With this embodiment of the process of the present invention, the dyestuffs remain in the extraction residue, and the aromatics and the undesirable solvent residues can be separated from the dyestuffs quantitatively as well as more economically than by means of the known molecular distillation. To achieve an extraction of only the aromatics, the paprika oleresin preferably is contacted with a supercritical gas at a pressure of $>p_k$ to 150 bar and a temperature of $>T_k$ to 70° C.

The paprika oleoresin can be treated in accordance with the present invention to extract both the aromatics and the dyestuffs. Such an extraction process can be a one stage extraction process wherein the aromatics and dyestuffs are preferably extracted at a pressure of 150 to 350, or a two stage extraction process. In the two stage extraction, the aromatics preferably are extracted at a pressure of $>p_k$ to 150, and the dyestuffs preferably at a pressure of 150 to 350 bar.

Thus, the range of applicability of the process of the present invention can be broadened according to the present invention by using paprika oleoresin instead of pepper as the starting material.

The variants provided by the present invention permit, in an advantageous manner, either continuous or semicontinuous operation.

Referring now to the drawing, which illustrates an apparatus that can be used for a two-stage extraction, dried bell peppers 1 are comminuted in a mill 2 and collected in a storage vessel 3. From storage vessel 3, comminuted pepper 4 is conveyed into a pressure vessel 5. This is done either discontinuously with the comminuted pepper 4 being introduced in charges into pressure vessel 5, or continuously with the comminuted pepper 4 being processed with water 6 to a pumpable slurry which, after being heated in a heat exchanger 7, is conveyed into pressure vessel 5 by means of a pump 8.

A pump 9 brings a liquefied solvent 10 to the extraction pressure and conveys it into a heat exchanger 11 where it is heated to the extraction temperature. Thereafter, the now supercritical solvent reaches pressure vessel 5 in which the extraction temperature is maintained by a jacket heating system (not shown). The supercritical solvent flows through the bulk of comminuted pepper or the pepper slurry and thereby charges itself with the aromatics. The supercritical, charged gas phase leaves pressure vessel 5 through a conduit 12 and is expanded through a valve 13 into a vessel 14 where the aromatics precipitate and can be removed at the bottom of vessel 14. From vessel 14, the gaseous solvent reaches a condenser 15 where it is liquefied. The liquefied solvent 10 is then returned to the extraction circuit by pump 9. Solvent losses are replaced by the supply of fresh gaseous solvent from a storage vessel 17 through a conduit 16.

After the extraction of the aromatics, valve 13 is closed and the extraction pressure is increased. The supercritical gas phase in pressure vessel 5 now takes on the red dyestuffs and travels through a conduit 18 into a valve 19 where it is expanded into a vessel 20. The dyestuffs collect as a water containing concentrate at the bottom of vessel 20 while the gaseous solvent reaches condenser 15.

If carbon dioxide is used as the gaseous solvent, a pressure of 120 bar and a temperature of 40° C. is used in the first extraction stage, while in the second extraction stage a pressure of 320 bar and a temperature of 40° C. is used. The resulting dyestuff concentrate is practically free of aromatics.

During the manufacturing process, the aromatics and dyestuffs are neither damaged by oxidation with oxygen from the air nor by heat since, due to the existing excess pressure, no oxygen from the air is present during the individual process steps and the highest temperature usually occurs in the extraction stages. After the two-stage extraction, the extraction residue 121 is removed from pressure vessel 5. Since extraction residue 21 contains no remaining solvent, it can be processed into animal feed.

The solvents used in the process according to the present invention are gaseous under normal conditions, i.e. at 0° C. and at 1 bar. Carbon dioxide, ethane and ethene have been found particularly suitable as solvents, since these gases can be purified at an economically justifiable expense to such an extent that they no longer contain any physiologically harmful impurities. Moreover, these gases are chemically inert with respect to the substances contained in bell peppers. The gaseous solvents used for implementing the process according to the invention have the following critical data:

| Solvent | $T_k$ | $P_k$ |
|---------|-------|-------|
| $CO_2$ | 31.1° C. | 73.9 bar |
| $C_2H_6$ | 32.2° C. | 49.1 bar |
| $C_2H_4$ | 9.5° C. | 50.7 bar |

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

930 g of a dried, ground, very hot red pepper were extracted in a first stage with 19.7 kg/h carbon dioxide for 6 hours at 120 bar and 40° C. An extract was separated from the supercritical gas phase of the first extraction stage by reducing the pressure to 56 bar. This extract had a weight of 140 g, was orange-yellow in color and contained water. It had a pasty consistency and was extremely pungent. This extract contained the fragrances and flavors of the pepper.

After the first extraction stage, the extraction pressure was increased to 320 bar and the pepper in pressure vessel 5 was extracted for four hours with 12.3 kg/h carbon dioxide at 40° C. 22.7 g of a dark-red, liquid dyestuff concentrate were separated from the supercritical gas phase. The separation of the dyestuff concentrate took place at a pressure of 50 bar and a temperature of 40° C. The dyestuff concentrate is free of fragrances and flavors and can be used as a food dye.

EXAMPLE 2

300 g of dried, coarsely comminuted, sweet red pepper containing 14 percent by weight water and no capsaicin was extracted for 6 hours at 300 bar and 40° C. with 9.6 kg/h carbon dioxide. 24.6 g of a water-containing dyestuff concentrate were separated from the supercritical gas phase at 40 bar and 40° C. The concentrate was dark red in color and had a viscous, oil-like consistency. The extraction residue was a pale orange-yellow in color and was not changed in its structure by the extraction. The dyestuff concentrate had no annoying pungent taste, but did contain a few pepper aromatics. The dyestuff concentrate was suitable for coloring certain foodstuffs (meat products).

EXAMPLE 3

800 g of dried, finely ground, red sweet pepper with a water content of about 14 percent by weight were extracted for 4 hours with 9.3 kg/h ethane at 250 bar and 45° C. 22.6 g of a substantially water-free dyestuff concentrate which was dark red in color and had a viscuous, oil-like consistency were separated from the supercritical gas phase at 46 bar and 45° C. The extraction residue had taken on a pale, orange-yellow color and the dyestuff concentrate was free of solvent residues and had no pungent taste, but did contain a few pepper aromatics.

It will be understood that the above description of the present invention is susceptible to various modifications, changes and adaptations, and the same are intended to be comprehended within the meaning and range of equivalents of the appended claims.

What is claimed is:

1. Process for treating bell peppers which contain aromatics and dyestuffs by extraction of the peppers with a solvent, comprising:
    extracting dried, comminuted red pepper with a solvent which is in the supercritical state with respect to pressure and temperature and which under normal conditions is a gas, at a pressure of $>p_k$ to 350 bar and a temperature of $>T_k$ to 70° C. to form (a) a charged supercritical gas phase containing an extract which comprises at least the aromatics or the dyestuffs and (b) an extraction residue;
    separating the charged supercritical gas phase from the extraction residue; and
    separating the extract from the separated, charged supercritical gas phase by a reduction in the density of the gas phase.

2. Process as defined in claim 1, wherein carbon dioxide, ethane, ethene or a mixture of ethane and ethene is used as the gaseous solvent.

3. Process as defined in claim 1 or 2, wherein the gaseous solvent contains an entrainer.

4. Process as defined in claim 3, wherein the entrainer is ethanol.

5. Process as defined in claim 1 or 2, wherein the density of the charged supercritical gas phase is lowered by a reduction of the pressure.

6. Process as defined in claim 1 or 2, wherein the density of the charged supercritical gas phase is lowered by a reduction of the pressure and a change in temperature.

7. Process as defined in claim 1 or 2, wherein:
    the dried and comminuted pepper is extracted in a first extraction stage with a gaseous solvent which is in the supercritical stage at a pressure of $>p_k$ to 150 bar to form (a) a first charged supercritical gas phase containing aromatics and (b) a first extraction residue which is pepper free of aromatics,
    the first charged supercritical gas phase is separated from the first extraction residue,
    the extracted aromatics are separated from the charged supercritical gas phase of the first extraction stage,
    the pepper which is free of aromatics is extracted in a second extraction stage with a gaseous solvent which is in the supercritical state at a pressure from 150 to 350 bar to and form (a) a second charged supercritical gas phase containing dyestuffs and (b) a second extraction residue, and
    the second charged supercritical gas phase is separated from the second extraction residue, and
    the extracted dyestuffs are separated from the separated, charged, supercritical gas phase of the second extraction stage.

8. Process according to claim 7, wherein the same gaseous solvent is used in both extraction stages.

9. Process as defined in claim 1 or 2, wherein:
    the dried and comminuted pepper is extracted at 150 to 350 bar to obtain (a) a charged supercritical gas phase containing aromatics and dyestuffs and (b) an extraction residue,
    the charged supercritical gas phase containing aromatics and dyestuffs is separated from the extraction residue,
    first the dyestuffs are separated, in at least one fraction, from the separated, charged, supercritical gas phase by stepwise reduction of the density of the gas phase, and
    then the aromatics are separated, in at least one fraction, from the separated, charged, supercritical gas phase by stepwise reduction of the density of the gas phase.

10. Process for obtaining dyestuffs from bell peppers which are substantially free of capsaicin by extraction of the peppers with a solvent, comprising:
    extracting dried, comminuted red pepper which is substantially free of capsaicin in an extraction stage with a solvent which is in the supercritical state with respect to pressure and temperature and which under normal conditions is a gas, at a pressure of 150 to 350 bar and a temperature of $>T_k$ to 70° C. to form (a) a charged supercritical gas phase containing extracted dyestuff and (b) an extraction residue;
    separating the charged supercritical gas phase from the extraction residue; and
    separating the extracted dyestuffs from the separated, charged supercritical gas phase by a reduction in the density of the gas phase.

11. Process as defined in claim 10, wherein carbon dioxide, ethane, ethene or a mixture of ethane and ethene is used as the gaseous solvent.

12. Process as defined in claim 10, wherein the gaseous solvent contains an entrainer.

13. Process as defined in claim 12, wherein the entrainer is ethanol.

14. Process as defined in claim 10, wherein the density of the charged supercritical gas phase is lowered by a reduction of the pressure.

15. Process as defined in claim 10 or 11, wherein the density of the charged supercritical gas phase is lowered by a reduction of the pressure and a change in temperature.

16. Process for treating paprika oleoresin which contains aromatics and dyestuffs by extraction of the paprika oleoresin with a solvent, comprising:
    extracting paprika oleoresin with a solvent which is in the supercritical state with respect to pressure and temperature and which under normal conditions is a gas, at a pressure of $>p_k$ to 350 bar and a temperature of $>T_k$ to 70° C. to form (a) a charged supercritical gas phase containing an extract which comprises at least the aromatics and (b) an extraction residue which comprises at least the dyestuffs;
    separating the charged supercritical gas phase from the extraction residue, and separating the extract from the separated, charged supercritical gas phase by a reduction in the density of the gas phase.

17. Process as defined in claim 16, wherein carbon dioxide, ethane, ethene or a mixture of ethane and ethene is used as the gaseous solvent.

18. Process as defined in claim 16 or 17, wherein the gaseous solvent contains an entrainer.

19. Process as defined in claim 17, wherein the entrainer is ethanol.

20. Process as defined in claim 16, wherein the density of the charged supercritical gas phase is lowered by a reduction of the pressure.

21. Process as defined in claim 16 or 17, wherein the density of the charged supercritical gas is lowered by a reduction of the pressure and a change in temperature.

22. Process as defined in claim 16 or 17, wherein:
the paprika oleoresin is extracted in a first extraction stage with a gaseous solvent which is in the supercritical state at a pressure of $>p_k$ to 150 bar to form (a) a first charged supercritical gas phase containing aromatics and (b) a first extraction residue which is paprika oleoresin free of aromatics,
the first charged supercritical gas phase is separated from the first extraction residue,
the extracted aromatics are separated from the charged supercritical gas phase of the first extraction stage,
the paprika oleoresin which is free of aromatics is extracted in a second extraction stage with a gaseous solvent which is in the supercritical state at a pressure from 150 to 350 bar to form (a) a second charged supercritical gas phase and (b) a second extraction residue,
the second charged supercritical gas phase is separated from the second extraction residue, and
the extracted dyestuffs are separated from the separated, charged, supercritical gas phase of the second extraction stage.

23. Process according to claim 21, wherein the same gaseous solvent is used in both extraction steps.

24. Process as defined in claim 16 or 17, wherein:
the paprika oleoresin is extracted at 150 to 350 bar to obtain (a) a charged supercritical gas phase containing aromatics and dyestuffs and (b) an extraction residue,
the charged supercritical gas phase containing aromatics and dyestuffs is separated from the extraction residue,
first the dyestuffs are separated, in at least one fraction, from the separated, charged, supercritical gas phase by stepwise reduction of the density of the gas phase, and
then the aromatics are separated, in at least one fraction, from the separated, charged, supercritical gas phase by stepwise reduction of the density of the gas phase.

25. Process according to claim 16 or 17, wherein the extraction is conducted at a pressure of $>p_k$ to 150 bar to extract aromatics into the supercritical gas phase.

* * * * *